(12) United States Patent
Han

(10) Patent No.: US 7,308,366 B2
(45) Date of Patent: Dec. 11, 2007

(54) METHOD OF DETERMINING A WEIGHTED REGRESSION MODEL AND METHOD OF PREDICTING A COMPONENT CONCENTRATION OF MIXTURE USING THE WEIGHTED REGRESSION MODEL

(75) Inventor: Sang-joon Han, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 54 days.

(21) Appl. No.: 11/052,289

(22) Filed: Feb. 8, 2005

(65) Prior Publication Data

US 2005/0187445 A1    Aug. 25, 2005

(30) Foreign Application Priority Data

Feb. 11, 2004    (KR) ..................... 10-2004-0008935

(51) Int. Cl.
*G06F 15/00* (2006.01)
(52) U.S. Cl. ..................................... 702/28
(58) Field of Classification Search .................. 702/28
See application file for complete search history.

(56) References Cited

OTHER PUBLICATIONS

W.M. Doyle, Comparison of Near-IR and Raman Analysis for Potential Process Applications, IFPAC-2001, Paper I-020, Jan. 21-24, 2001.*
Brice Carnalhan, Applied Numerical Methods, 1969, Wiley, p.*
You, Jo-young, et al, "Regression Diagnositcs System by Dynamic Graphics", Korean Journal of Applied Statistics, vol. 10, No. 2, pp. 241-250 (Sep. 1997) (with English Abstract).

\* cited by examiner

*Primary Examiner*—John E. Barlow, Jr.
*Assistant Examiner*—Stephen J Cherry
(74) *Attorney, Agent, or Firm*—Lee & Morse, P.C.

(57) ABSTRACT

In a method of determining a regression model, and a method of predicting a component concentration of a test mixture using the regression model, the method of determining the regression model includes selecting a regression model, generating a plurality of observation points, each one of the plurality of observation points having a prediction target value and a measured value, determining a weight of the prediction target value and the measured value at each one of the plurality of observation points, and obtaining a calculation amount by reflecting the weights in differences between predicted values acquired by applying the measured values to the regression model and the prediction target values, and determining coefficients of the regression model to minimize the calculation amount.

14 Claims, 5 Drawing Sheets

METHOD OF DETERMINING A WEIGHTED REGRESSION MODEL AND METHOD OF PREDICTING A COMPONENT CONCENTRATION OF MIXTURE USING THE WEIGHTED REGRESSION MODEL

BACKGROUND OF THE INVENTION

1. Field of the Invention

The present invention relates to a method of determining a weighted regression model and a method of predicting a component concentration of a mixture using the weighted regression model. More particularly, the present invention relates to a method of determining a leverage weighted regression model and a method of predicting a component concentration of a mixture using the leverage weighted regression model.

2. Description of the Related Art

Conventionally, a linear regression method is used to predict concentrations of specific components dissolved in a mixture from a spectrum of the mixture. This method is different from a method of measuring the concentrations using reagents reacting with the components to be measured, and can be applied to non-reagent measurement of blood components or non-invasive measurement of blood components.

A simple regression model, which is used to predict dependent variables from independent variables, is generally based on the following assumptions. First, it is assumed that the relationship between an independent variable, x, e.g., a measured spectrum data, and a dependent variable, y, , e.g., a component concentration to be measured, can be expressed by the following equation (1), in which $\mu_{y \cdot x}$ indicates an expected value y at a given value of x, as expressed in equation (1):

$$\mu_{y \cdot x} = \beta_0 + \beta_1 x_i \qquad (1),$$

where $x_i$ is a value of an i-th measured x, and $\beta_0$ and $\beta_1$ are regression coefficients of a population, respectively.

Second, it is assumed that y has a normal distribution curve at a given value of x, and an average value of y varies with a variation of x, but a variance value of y is constant regardless of the variation of x.

Under these assumptions, the simple regression model may be expressed by the following equation (2):

$$y_i = \beta_0 + \beta_1 x_i + \epsilon_i \qquad (2),$$

where $y_i$ is the i-th estimated value, $\epsilon_i$ is an error term of the i-th measured y.

In the second assumption, the equivalent variance of the error term $\epsilon_i$ is assumed regardless of a variation of y, i.e., $Var(\epsilon_i) = \sigma^2$, where $\sigma$ is variance. However, such an assumption of equivalent variance may not be established, and particularly, in a reference measurement device for a training set for obtaining a regression vector as the value of y increases, the greater the increase in the measurement error. Further, the least square method usually used for forming a regression model may be greatly influenced by abnormal measured values, thereby causing distortion of the regression model by a small number of outliers, which may also cause a normal measured value to be judged as an outlier. FIGS. 1A and 1B are graphs illustrating predicted values using a regression model, where FIG. 1A shows a normal regression model 2 in accordance with normal measured data 1, and FIG. 1B shows a distorted regression model 4 due to outliers 3.

Generally, a training set is required for forming a regression model, and all observation points belonging to the training set equally contribute to the regression model. However, it cannot be said that the quantity and quality of data required for forming the regression model should be equally given to all observation points. For example, since an error of the reference measurement device decreases when y decreases, it can be said that an observation point having a smaller y is more reliable than an observation point having a larger y. Further, because they are highly likely to have wrong data, observation points having independent variable x as an outlier should have relatively less importance in the regression equation than the other observation points.

SUMMARY OF THE INVENTION

The present invention is therefore directed to a method of determining a leverage weighted regression model and a method of predicting a component concentration of a mixture using the leverage weighted regression model, which substantially overcome one or more of the problems due to the limitations and disadvantages of the related art.

It is a feature of an embodiment of the present invention to provide a method of determining a regression model for expressing observation points nearly exactly by giving different weights to the observation points in accordance with the quality or importance of information of the observation points when generating the regression model.

It is another feature of an embodiment of the present invention to provide a method of estimating component concentrations of a test mixture using the determined regression model.

At least one of the above and other features and advantages of the present invention may be realized by providing a method of determining a regression model including selecting a regression model, generating a plurality of observation points, each one of the plurality of observation points having a prediction target value and a measured value, determining a weight of the prediction target value and the measured value at each one of the plurality of observation points, and obtaining a calculation amount reflecting differences between predicted values and the prediction target values, and determining coefficients of the regression model to minimize the calculation amount.

The weights at each one of the plurality of observation points may be separately calculated and then summed. The weight of each prediction target value may be determined so that the weights decrease as the prediction target values increase. A reference value for the measured values may be obtained and the weight of each measured value may be determined so that the weights increase as the measured values approach the reference value.

Determining the weight of each measured value may include obtaining the reference value for each of the measured values, obtaining leverage of each measured value with respect to the reference value, and determining the weight of each measured value to decrease as leverage increases.

At least one of the above and other features and advantages of the present invention may be realized by providing a method of predicting a component concentration of a test mixture including collecting a plurality of observation points, each one of the plurality of observation points having spectrum data and component concentration included in a reference mixture, from a spectrum of the reference mixture, selecting a regression model, training the regression model to output the component concentration with respect to the spectrum data at each observation point, and determining the regression model, extracting indication spectrum data from a spectrum of the test mixture, and obtaining component concentrations of the test mixture by applying the extracted indication spectrum data to the regression model.

Determining the regression model may include determining a weight for the component concentration and the spectrum data at each of the observation points and setting the component concentrations to concentration target values, obtaining a calculation amount by reflecting the weights in differences between outputs acquired by applying the spectrum data to the regression model and the concentration target values, and determining coefficients of the regression model to minimize the calculation amount.

The weights may be separately calculated and summed. The weight of each concentration target value with a larger concentration target value may be determined to be smaller.

The test mixture may be a body fluid, and the spectrum of the test mixture may be selected from the group consisting of an absorption spectrum of the body fluid and a light scattering spectrum with respect to wavelength.

A reference value for the spectrum data may be obtained and the weight of each spectrum data may be determined so that the weights increase as the measured values approach the reference value.

Determining the weight of each spectrum data may include obtaining the reference value for the spectrum data, obtaining leverage of each spectrum data with respect to the reference value, and determining the weight of each spectrum data to decrease as leverage increases.

At least one of the above and other features and advantages of the present invention may be realized by providing a computer readable recording medium on which a program for executing the above method of determining a regression model is recorded.

At least one of the above and other features and advantages of the present invention may be realized by providing a computer readable recording medium on which a program for executing the above method of predicting component concentrations of a test mixture is recorded.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1A:
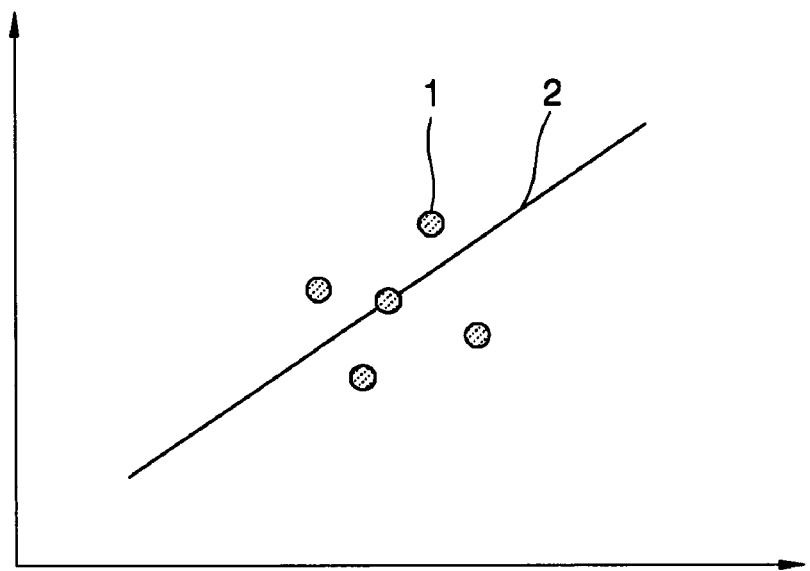
FIGS. 1A and 1B are graphs illustrating predicted values of a regression model.
Figure 1B:
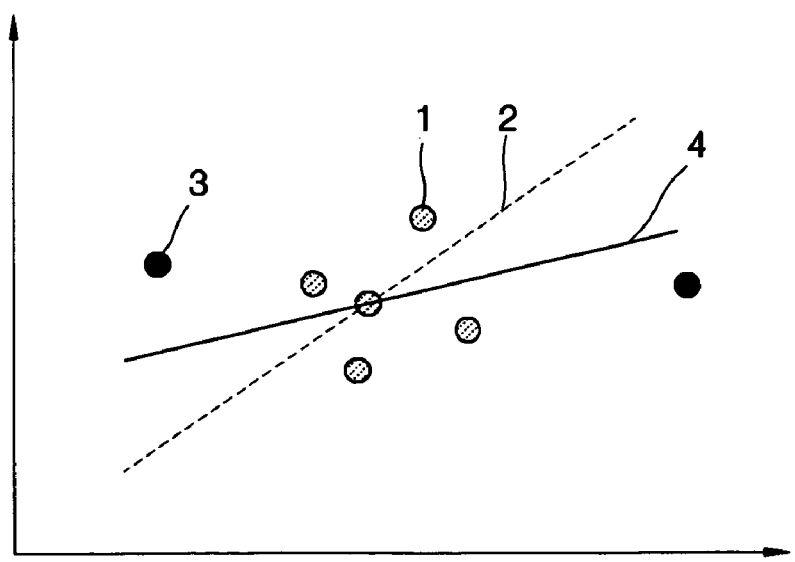

Korean Patent Application No. 10-2004-0008935, filed on Feb. 11, 2004, in the Korean Intellectual Property Office, and entitled: "Method of Determining a Weighted Regression Model and Method of Predicting a Component Concentration of a Mixture Using the Weighted Regression Model," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 2:
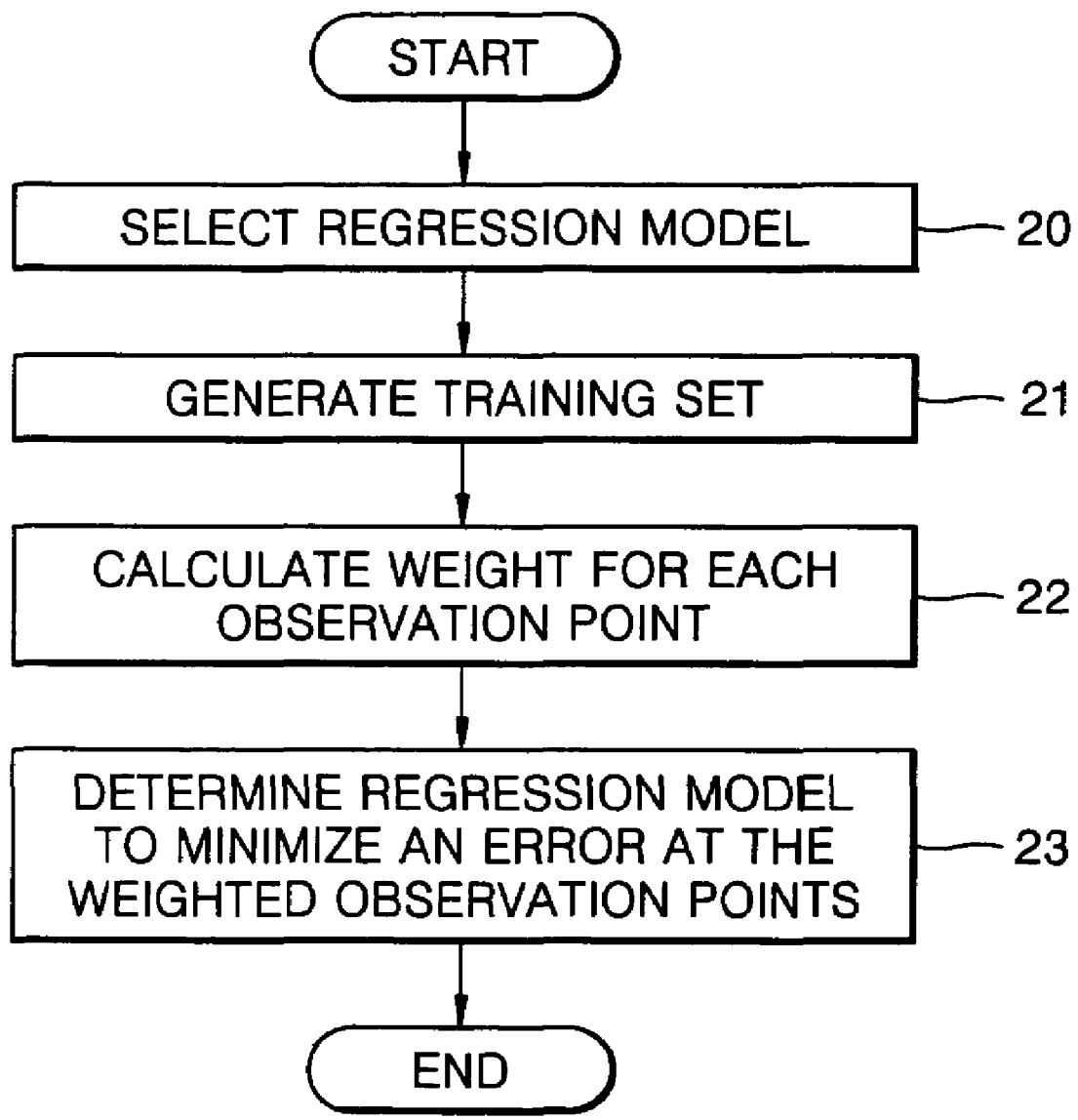
FIG. 2 is a flowchart illustrating a method of determining a regression model according to an embodiment of the present invention.

FIG. 2 is a flowchart illustrating a method of determining a regression model according to an embodiment of the present invention. Initially, in operation 20, a regression model to be used is selected. For example, the regression model given by equation (2) may be selected. In operation 21, a training set is generated by collecting observation points and then determining independent variables, or explanatory variables, $x_i$ and dependent variables, or predictor variables, $y_i$ for each of the observation points. When the training set is generated, in operation 22, weights to be applied to the variables of each observation point are calculated.

The weights are derived from x and y for each observation point. First, since errors of a reference measurement device generally decrease with a smaller value of y, a weight for y can be determined to be inversely proportional to y by the following equation (3):

$$w_i^y = 1/y_i^2 \qquad (3),$$

where $w_i^y$ is a weight for $y_i$, and $y_i$ is a value of y at the i-th observation point.

A barometer for indicating a possibility that a measured value x is an outlier should be provided for x. In this embodiment, leverage is introduced as a barometer of outliers. The leverage is a barometer indicating how far the observation points are apart from a reference value. A large leverage, however, does not always indicate an outlier. Although observation points having a large leverage, but which are not outliers, are completely removed from the training set, the regression model is not distorted. Accordingly, the leverage can be used as a weighting factor. Therefore, in this embodiment, after obtaining a reference value measured by a reference measurement device (not shown), a weight for x can be determined using the leverage $H_i$ of the measured value with respect to the reference value according to equation (4):

$$w_i^x = 1/H_i^2 \qquad (4),$$

where $w_i^x$ is the weight for $x_i$, and $H_i$ is the leverage of the i-th observation point.

The leverage may be obtained using any conventional method and in this embodiment, the leverage may be obtained using x as in the following equation (5):

$$H = x(x'x)^{-1}x' \qquad (5).$$

When both of $W_i^x$ and $w_i^y$ are determined, a final weight for the relevant observation point can be expressed by the following equation (6):

$$w_i = w_i^x + w_i^y \qquad (6).$$

Figure 3A:
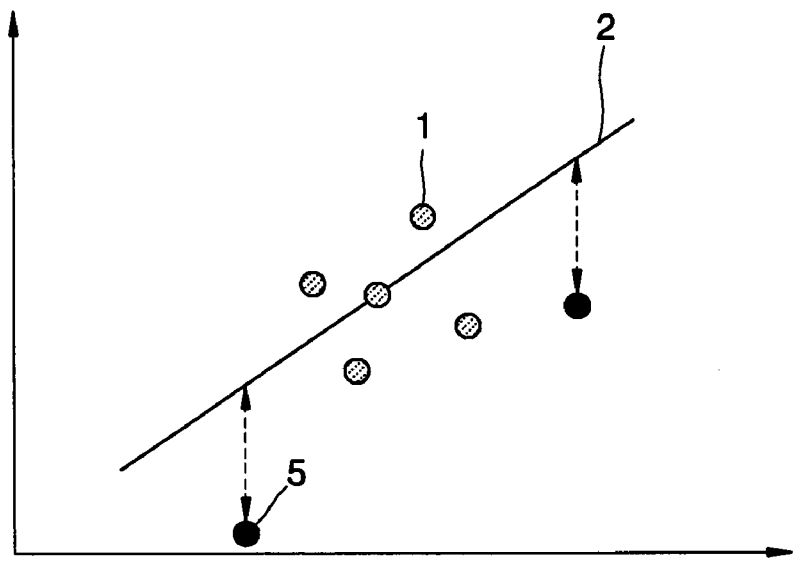
FIGS. 3A and 3B are graphs illustrating predicted values of the regression model according to an embodiment of the present invention.
Figure 3B:
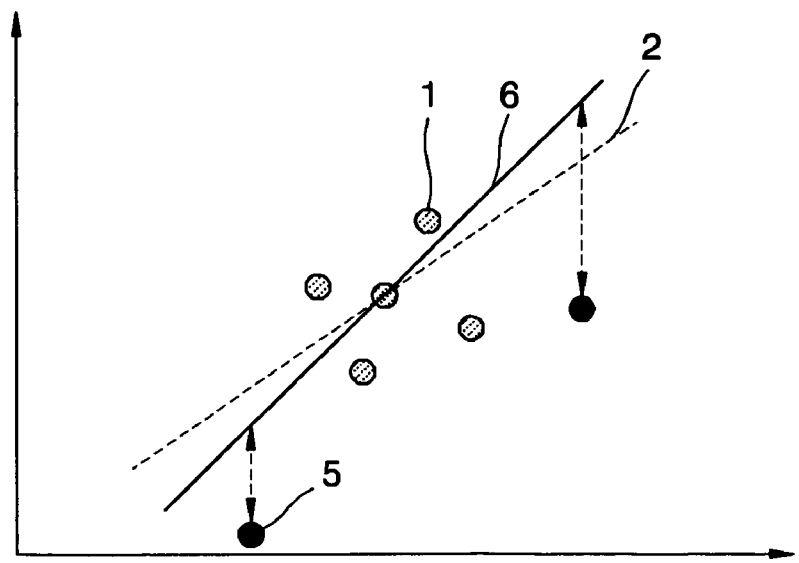

FIGS. 3A and 3B are graphs illustrating predicted values of the regression model, where FIG. 3A shows the regression model 2 based on observation data 1 when the weights for data 5 departing from any data group are not considered, and FIG. 3B shows a regression model 6, which is varied in consideration of the departed degree for data 5 departing from any data group and weighting of the data 5.

A calculation amount S can be obtained by the following equation (7) using the errors of the observation points reflecting the weights shown in equation (6), i.e., differences between prediction target values and predicted values obtained by applying the actual value $x_i$ to the regression model of equation (2).

$$S = \sum_i w_i (y_i - \beta_0 - \beta_1 - x_i)^2. \qquad (7)$$

Referring back to FIG. 2, in operation 23, the regression model of equation (2) is determined by obtaining regression coefficients $\beta_0$ and $\beta_1$ that minimize the calculation amount S of equation (7) using the linear regression method. Although a simple regression model having only one dependent variable has been described, the present invention may be equally applied to a multiple regression model having a plurality of dependent variables.

Figure 4:
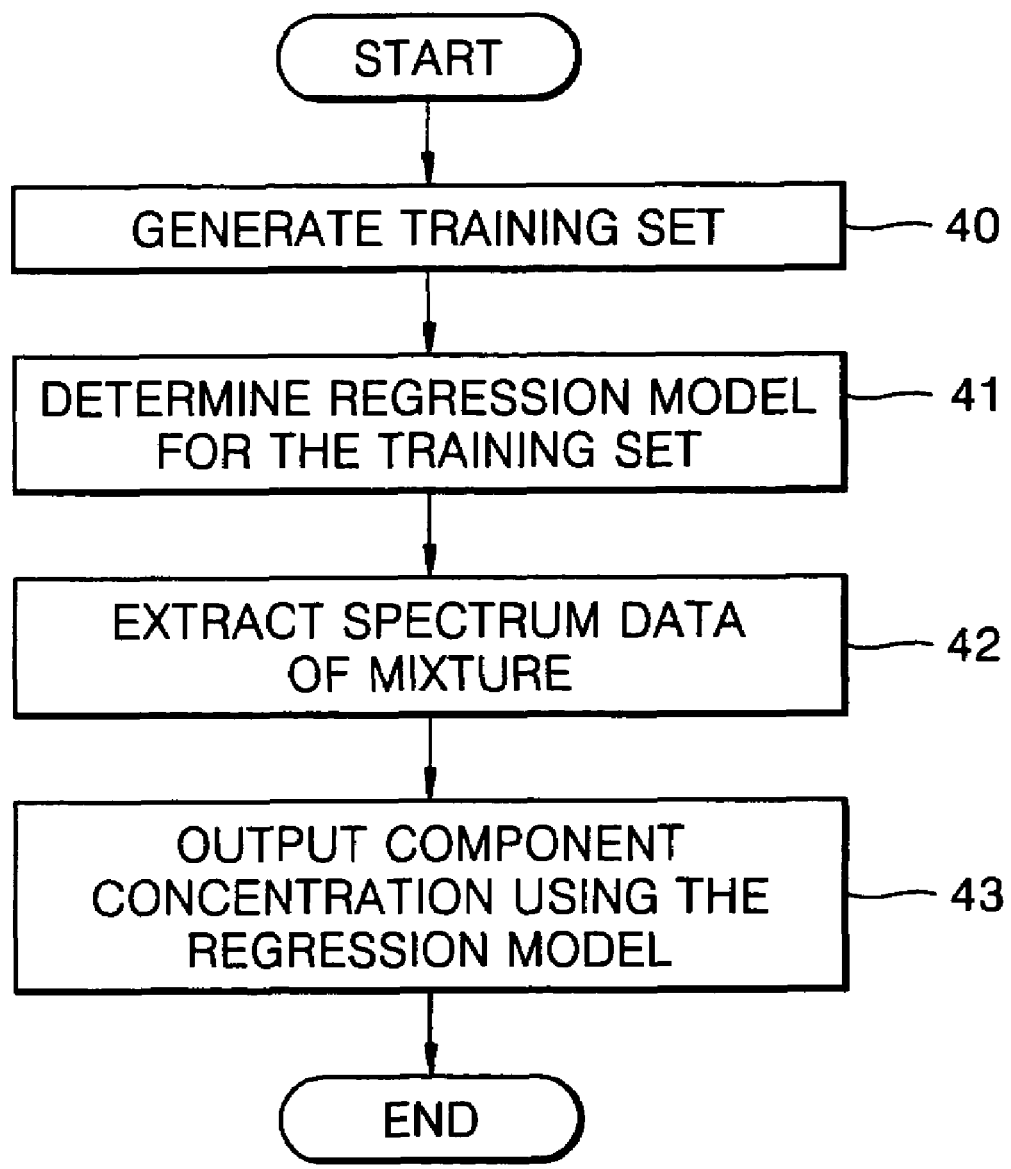
FIG. 4 is a flowchart illustrating a method of predicting a component concentration of a mixture according to an embodiment of the present invention.

FIG. 4 is a flowchart illustrating a method of predicting a component concentration of a mixture according to an embodiment of the present invention. Initially, in operation 40, a training set including component concentrations of a reference mixture with respect to spectrum data is generated by collecting observation points from the spectrum data of the reference mixture. Here, for example, when a test mixture, i.e., the mixture to be tested, is a body fluid, a spectrum of the test mixture and the reference mixture may be an absorption spectrum of the body fluid or a light scattering spectrum with respect to wavelength. For the training set generated in operation 40, in operation 41, a regression model for predicting a component concentration from the spectrum of the reference mixture is determined using the method of determining a regression model described in connection with FIG. 2.

In operation 42, the spectrum data of the test mixture are extracted. In operation 43, concentrations of corresponding components are output by applying the extracted spectrum data to the regression model determined in operation 41.

Figure 5:
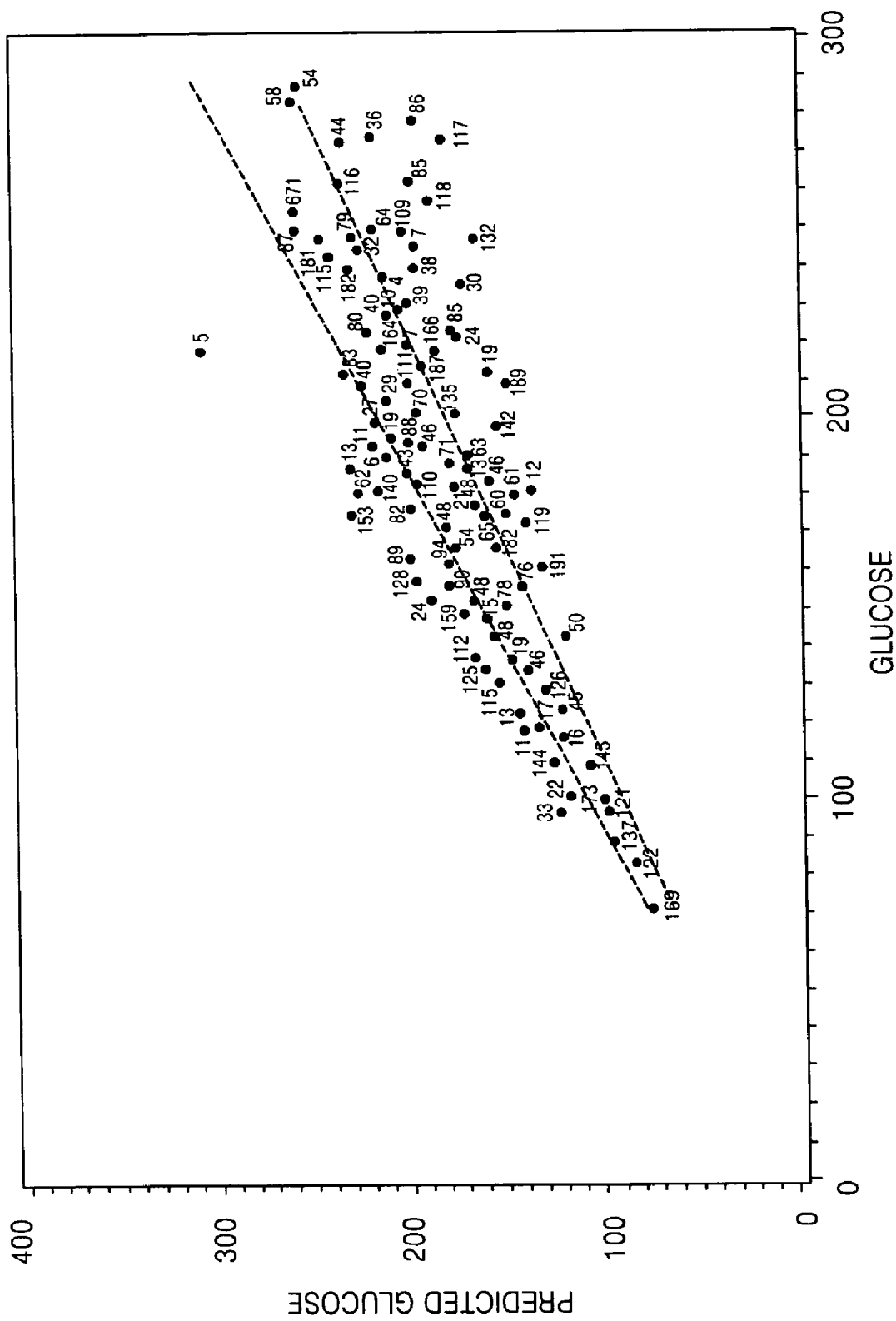
FIG. 5 is a graph illustrating a glucose concentration predicted according to an embodiment of the present invention and a glucose concentration actually present in a subject's blood.

FIG. 5 is a graph illustrating a glucose concentration predicted according to an embodiment of the present invention and a glucose concentration actually present in a subject's blood. In this embodiment, the regression model is selected such that the error thereof is smaller at low concentrations than at high concentrations. Thus, it may be seen that a predicting error is improved at a lower concentration. Since accuracy of the reference measurement device is generally increased at lower concentrations, data at a lower concentration has better quality than data at a higher concentration. This situation, however, is not reflected in the simple regression model. In addition, in the regression model according to an embodiment of the present invention, since the observation points measured at the lower concentration are weighted and then applied to the regression model, it may be seen that accuracy is enhanced at lower concentrations.

The present invention may also be embodied as computer readable codes on a computer readable recording medium. The computer readable recording medium may be any data storage device that can store data that can be subsequently read by a computer system. Examples of the computer readable recording medium may include read-only memory (ROM), random-access memory (RAM), CD-ROMs, magnetic tapes, floppy disks, optical data storage devices, and carrier waves, e.g., data transmission through the Internet. The computer readable recording medium may also be distributed over network coupled computer systems so that the computer readable code may be stored and executed in a distributed fashion. In addition, functional programs, codes, and code segments for accomplishing the present invention can be easily construed by programmers skilled in the art to which the present invention pertains.

According to an embodiment of the present invention, more accurate predicted values can be obtained by forming a regression model reflecting degrees of importance of the observation points.

Further, in the conventional least square method, when observation points having a large leverage are not modeled well, the least square for observation points having a larger leverage increases more steeply than that for observation points having a smaller leverage. Consequently, the importance of the observation points having the large leverage is increased in the formation of the regression model. On the contrary, in an embodiment of the present invention, it is possible to relatively decrease distortion of the regression model due to the outliers by giving less weight to observation points having a larger leverage.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of determining a regression model, comprising:

selecting a regression model;

generating a plurality of observation points, each one of the plurality of observation points having a prediction target value and a measured value;

determining a weight of the prediction target value and the measured value at each one of the plurality of observation points;

determining a predicted value by applying the measured value at each one of the plurality of observation points to the regression model;

obtaining a calculation amount by multiplying the weight of each of the plurality of observation points by a difference between the predicted value and the prediction target value for each of the plurality of observation points;

determining coefficients of the regression model to minimize the calculation amount;

estimating characteristics of a sample using the determined regression model; and outputting estimated characteristics.

2. The method as claimed in claim 1, wherein determining the weight comprises:
separately calculating a first weight for the prediction target value and a second weight for the measured value; and
adding the first and second weights.

3. The method as claimed in claim 2, wherein the first weights decrease as the prediction target values increase.

4. The method as claimed in claim 2, wherein calculating the second weight comprises obtaining a reference value for the measured values, wherein the second weights increase as the measured values approach the reference value.

5. The method as claimed in claim 4, wherein determining the second weight of each measured value comprises:
obtaining the reference value for each of the measured values; and
obtaining leverage of each measured value with respect to the reference value, wherein the second weight of each measured value decreases as leverage increases.

6. A method of predicting a component concentration of a test mixture, comprising:
collecting a plurality of observation points, each one of the plurality of observation points having spectrum data and component concentration included in a reference mixture, from a spectrum of the reference mixture;
selecting a regression model, training the regression model to output the component concentration with respect to the spectrum data at each observation point, and determining the regression model, determining the regression model including
determining a weight for the component concentration and the spectrum data at each of the observation points,
setting the component concentrations to concentration target values,
determining predicted concentrations by applying the spectrum data to the regression model,
obtaining a calculation amount by multiplying the weight of each of the plurality of observation points by a difference between the predicted concentrations and the concentration target values for each of the plurality of observation points, and
determining coefficients of the regression model to minimize the calculation amount;
extracting indication spectrum data from a spectrum of the test mixture;
obtaining component concentrations of the test mixture by applying the extracted indication spectrum data to the regression model; and
outputting component concentrations.

7. The method as claimed in claim 6, wherein determining the weight comprises:
separately calculating a first weight for the concentration target value and a second weight for the measured value; and
adding the first and second weights.

8. The method as claimed in claim 7, wherein the first weights decrease as concentration target values increase.

9. The method as claimed in claim 7, wherein calculating the second weight comprises obtaining a reference value for the spectrum data, wherein the second weights increase as the spectrum data values approach the reference value.

10. The method as claimed in claim 9, wherein determining the second weight comprises:
obtaining the reference value for the spectrum data; and
obtaining leverage of each spectrum data with respect to the reference value, wherein the second weight of each spectrum data decreases as leverage increases.

11. The method as claimed in claim 6, wherein the test mixture is a body fluid, and the spectrum of the test mixture is selected from the group consisting of an absorption spectrum of the body fluid and a light scattering spectrum with respect to wavelength.

12. A computer readable recording medium on which a program for executing a method of determining a regression model is recorded, the method comprising:
selecting a regression model;
generating a plurality of observation points, each one of the plurality of observation points having a prediction target value and a measured value;
determining a weight of the prediction target value and the measured value at each one of the plurality of observation points;
determining a predicted value by applying the measured value at each one of the plurality of observation points to the regression model;
obtaining a calculation amount by multiplying the weight of each of the plurality of observation points by a difference between the predicted value and the prediction target value for each of the plurality of observation points;
determining coefficients of the regression model to minimize the calculation amount;
estimating characteristics of a sample using the determined regression model; and
outputting estimated characteristics.

13. A computer readable recording medium on which a program for executing a method of predicting component concentrations of a test mixture is recorded, the method comprising:
collecting a plurality of observation points, each one of the plurality of observation points having spectrum data and component concentration included in a reference mixture, from a spectrum of the reference mixture;
selecting a regression model, training the regression model to output the component concentration with respect to the spectrum data at each observation point, and determining the regression model, determining the regression model including
determining a weight for the component concentration and the spectrum data at each of the observation points,
setting the component concentrations to concentration target values,
determining predicted concentrations by applying the spectrum data to the regression model,
obtaining a calculation amount by multiplying the weight of each of the plurality of observation points by a difference between the predicted concentrations and the concentration target values for each of the plurality of observation points, and
determining coefficients of the regression model to minimize the calculation amount;
extracting indication spectrum data from a spectrum of the test mixture;
obtaining component concentrations of the test mixture by applying the extracted indication spectrum data to the regression model; and
outputting component concentrations.

14. A method of predicting a component concentration of a test mixture, comprising:

collecting a plurality of observation points, each one of the plurality of observation points having spectrum data and component concentration included in a reference mixture, from a spectrum of the reference mixture;

selecting a regression model, training the regression model to output the component concentration with respect to the spectrum data at each observation point, and determining the regression model;

extracting indication spectrum data from a spectrum of the test mixture;

obtaining component concentrations of the test mixture by applying the extracted indication spectrum data to the regression model; and outputting component concentrations, wherein the test mixture is a body fluid, and the spectrum of the test mixture is selected from the group consisting of an absorption spectrum of the body fluid and a light scattering spectrum with respect to wavelength.

* * * * *